Jan. 13, 1970　　　L. S. GALSTAUN ET AL　　3,489,506
METHOD OF REMOVING CARBON DIOXIDE FROM GASES
Filed April 19, 1965　　　　　　　　　　　　　3 Sheets-Sheet 1

INVENTORS
LIONEL S. GALSTAUN
BY EDWARD J. WASP

*Eckhoff and Slick*

ATTORNEYS

INVENTORS
LIONEL S. GALSTAUN
EDWARD J. WASP
BY
*Eckhoff and Slick*
ATTORNEYS

Jan. 13, 1970  L. S. GALSTAUN ET AL  3,489,506
METHOD OF REMOVING CARBON DIOXIDE FROM GASES
Filed April 19, 1965  3 Sheets-Sheet 3

INVENTORS
LIONEL S. GALSTAUN
EDWARD J. WASP
BY
Eckhoff and Slick
ATTORNEYS

United States Patent Office 3,489,506
Patented Jan. 13, 1970

3,489,506
METHOD OF REMOVING CARBON DIOXIDE FROM GASES
Lionel S. Galstaun, Berkeley, and Edward J. Wasp, San Rafael, Calif., assignors, by mesne assignments, to Bechtel International Corporation, San Francisco, Calif., a corporation of Delaware
Filed Apr. 19, 1965, Ser. No. 449,090
Int. Cl. B01d 53/14; C01b 2/30, 1/33
U.S. Cl. 23—2                                    5 Claims

ABSTRACT OF THE DISCLOSURE

The removal of $CO_2$ from gases by means of countercurrent flow with a thermally regeneratable alkaline solution wherein the major portion of the $CO_2$ is removed in a first extraction zone comprising a flooded tower and the final purification is achieved by countercurrent flow of the $CO_2$ containing gas through a thermally regeneratable alkaline solution in a second extraction zone comprising a tower having sieve trays with downcomers. Both of the above countercurrent extractions can be performed in one tower or in separate towers. The temperature of both extraction zones is independently controlled so that the first extraction zone is of a higher temperature than said second zone.

This invention is concerned with an improvement in the regenerative processes for extraction and recovery of carbon dioxide from gaseous mixtures. In its broadest sense, it is applicable to the absorpotion of certain species from a mixture, gaseous or liquid, where the time rate of the absorption process is controlled by the mass transfer rate in the absorption medium, the reaction rate of the absorbed species with one or more components of the absorbent, or both. The selective absorption of carbon dioxide from a gaseous mixture by an alkaline absorbent solution is such a case. Examples of such alkaline solutions include sodium or potassium hydroxide, sodium or potassium carbonate, the several alkanolamines, and the various activated sodium or potassium carbonates. Sodium or potassium hydroxide are generally not regeneratable to the hydroxide, but are converted irreversibly to carbonate and/or bicarbonate. On the other hand, the carbonates, activated or not, and the alkanolamines can be regenerated for reuse. The hydroxides, however, are inherently capable of much more complete removal of carbon dioxide. For economic reasons therefore, it is customary to use the regeneratable absorbents for the bulk removal of carbon dioxide, and the hydroxides in a second stage treatment for only the last traces. Since the hydroxides are not regeneratable, they are discarded when the free hydroxide content is depleted.

The carbonate, alkanolamine and hydroxide solutions have certain common characteristics with respect to limitations in their ability to remove carbon dioxide from gaseous mixtures. The time rate of absorption of carbon dioxide is limted by the lquid film mass transfer coefficient and by the rate of reaction of the absorbed carbon dioxide with the reactive species in the bulk of the absorbent. Diffusion of carbon dioxide through the bulk gas phase or the gas film exerts a negligible retardant effect. The improved apparatus of this invention provides an enhancement in the performance of all three classes of absorbents.

In the past, packed towers have been used more successfully than tray towers in the absorption of carbon dioxide from gas mixtures. Analysis of the available contact times for gas and absorbent in packed and conventionally designed tray towers with normal overflow weir heights of two to three inches, shows that the packed tower provides much longer contact time.

There are two principal reasons for this:
(1) Packed towers generally require larger diameters than plate towers for the same gas and liquid rates, and
(2) The entire packed volume is available for contact between gas and absorbent, whereas in tray towers, only the volume formed by the product of the active bubbling area on the tray and the froth height is useful. The volume occupied by the downcomers, and that above froth is not usable.

On the other hand, tray towers are less costly than packed towers in large sizes; this is due to the larger diameter of the packed tower for a given capacity, and the cost of packing materials. Large tray towers also have a substantial advantage over packed towers since they are not subject to erratic operation due to channeling of liquid, a common occurrence in large packed towers.

This invention provides means of providing longer contact times in tray towers, and also means of accelerating the absorption process in those sections of the absorption tower where the bulk of the carbon dioxide is absorbed.

In principle, maximum contact time in a tray tower is obtained when bubbling area is maximized. To increase bubbling area, it is usually necessary to minimize the tray area covered by downcomers. Contact time is also increased by raising the level of liquid absorbent on the trays, and this is accomplished by raising the height of overflow weirs. Raising the overflow weir also permits raising the underflow weir at the bottom of the downcomer, thus increasing the flow capacity of the downcomer. With increased flow capacity, it is possible to reduce downcomer area, and hence increase bubbling area. In the practice of this invention, all of these parameters are adjusted to obtain an optimum design.

In addition, in the sections of the absorber tower where the bulk of the absorbate species is being transferred to the absorbent, the trays are completely flooded with liquid, and no downcomers are used. Perforated or grid trays are used in this section so that the entire volume of the tower is available for contact between gas and liquid.

Finally, in order to maximize absorption rate in this bulk removal section, the temperature is raised substantially higher than in the upper section of the tower where the final purification is obtained. This may be done by introducing the gas at a high temperature, supplying hot absorbent, or both.

The advantage of operating the top and bottom of the absorption column at different temperatures may be clarified by reference to the well known alkanolamine system. In the conventional application to $CO_2$ removal with 16–20 wt. percent aqueous monoethanolamine (MEA), the lean solution temperature is selected by considerations based on:
(1) The equilibrium vapor pressure of $CO_2$ above lean solution and the degree of purification required.
(2) Maintenance of an appropriate driving force at the top of the column.
(3) Loss of MEA to treated gas because of its appreciable volatility.

The solution feed rate is governed by other considerations, such as:
(4) Maintaining sufficient uncombined MEA at the bottom of the column to prevent excessive corrosion, and to provide adequate driving force for mass transfer of $CO_2$ from rich gas to rich solution.

With the feed temperature and solution volume both determined, the temperature of solution at the bottom of the column is also determined by an overall heat balance which takes into account the heat of reaction and latent heat of condensation of water as well as the sensible heats of lean solution at the tower inlet nozzle, and gas at the inlet and exit conditions. Typically, an MEA absorber will be supplied with MEA solution at a temperature of about 110° F., and the corresponding bottom temperature may run about 150–155° F. At the usual loading of 4.5 to 5 s.c.f. of $CO_2$ per gallon of rich solution, the equilibrium vapor pressure of such rich solution would be about 2 p.s.i.a. at 155° F. By comparison, the partial pressure of $CO_2$ from a typical rich gas would range from about 30 to 80 p.s.i.a.

Raising the bottom temperature to the range of 190 to 250° F. would raise the partial pressure of rich solution to the range of 15 to 40 p.s.i.a. Thus, there will still be ample driving force but the reaction rates will be speeded up by a factor of 4 to 10 or more, and thus provide a net gain in the portion of the tower where the bulk of the absorption is required.

According to the scheme of this invention, this is done by cooling only a portion, say between 10 and 45 percent of the lean solution, and conveying this to the top of the absorption column. The remainder of the lean solution is taken hot from the regenerator and delivered to a midpoint in the absorber. The following advantages are obtained:

(a) Reduction in downcomer area in the top portion of the column, and consequent increased active area on the tray. Tray efficiency is consequently improved.

(b) Reduction in weir loading (g.p.m. of solution per foot of weir length) in the top portion of the column and consequent increase in froth height.

Both (a) and (b) tend to improve the absorption of $CO_2$.

(c) Reduction in amount of heat exchange surface required for cooling solution, and for lean-rich solution exchange.

(d) Reduced overall heat requirement for the process as a whole.

(e) Improved kinetics for the bulk absorption of $CO_2$ in the lower portion of the column.

The invention will be made clearer by reference to the drawings wherein.

Figure 1:
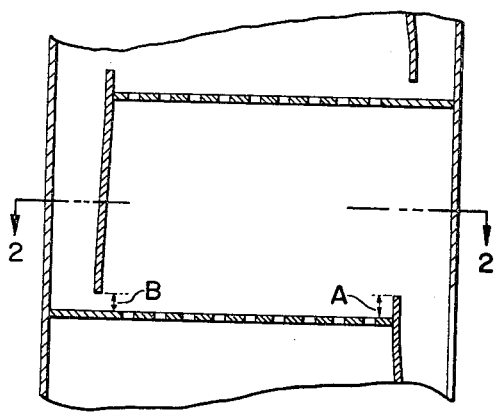
FIGURE 1 is an elevation in section of a sieve tray with downcomers.

Reference is now made to the drawings by reference characters.

In the usual embodiment of sieve trays the open area represented by the sum of the holes is typically in the range of 5 to 15 percent of the bubbling area, that is, the area limited by the overflow weir, the downcomer from the tray above, and the vessel walls between these chords. The diameter of the holes is typically ½ inch to 1 inch. In FIGURE 1, the dimension A is the height of the overflow weir, and the dimension B is the clearance between the downcomer and the tray deck. In the typical embodiment of a conventional tray, the dimension A would be 1 to 2 inches, and the dimension B generally would be about ¼ to ½ inch less, so as to provide a seal. In the practice of this invention, dimension A is increased to 4 inches or more, preferably 6 to 8 inches, and B about ¼ inch less. The total area of the holes is preferably in the range of 7 to 11 percent of the bubbling area, and the hole diameter reduced to the range of ¼ to ½ inch. The exact relationship of hole area and weir height is based on hydraulic principles which are well understood by those skilled in the art.

Figure 2:
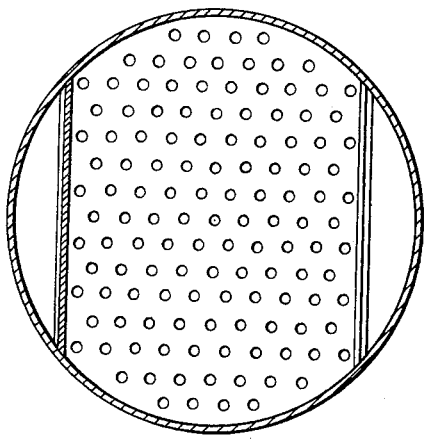
FIGURE 2 is a plan view on the line 2—2 of FIGURE 1.

In the practice of this invention, trays of the type represented by FIGURES 1 and 2 and employing the larger dimensions A and B outlined above, would be used in the upper portion of the absorber tower.

Figure 3:
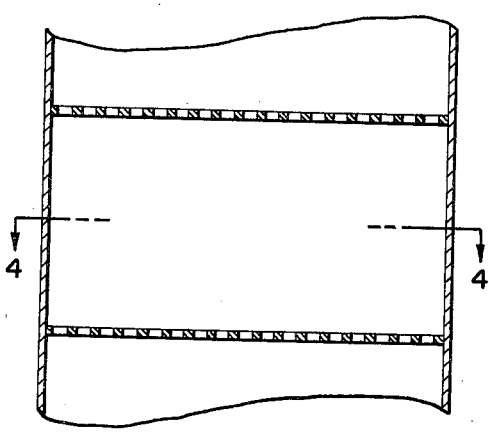
FIGURE 3 is an elevation in section of a perforated tray with no downcomers.
Figure 4:
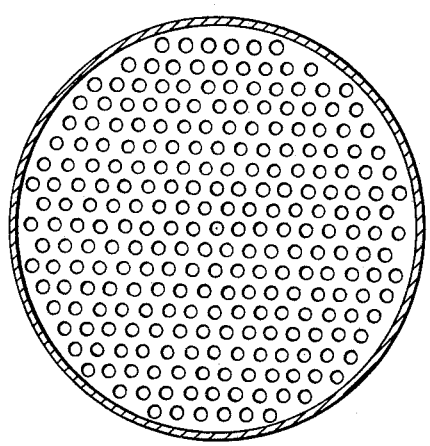
FIGURE 4 is a section on the line 4—4 of FIGURE 3.

FIGURES 3 and 4 illustrate a perforated tray with no downcomers. In trays of this design, liquid flows down through the holes, and gas rises through them. Trays of the type represented by FIGURES 3 and 4 differ from those of the type of FIGURES 1 and 2 principally in the much larger open area employed in the former. Typically, this open area, which is the percentage of the total tower cross sectional area taken up by the holes, is in the range of 20 to 30 percent. The hole diameters are usually in the range of ½ to 1 inch.

In the practice of the present invention, trays of the type of FIGURES 3 and 4 would be preferably employed in the bottom section of the tower, and would be flooded; that is, the continuous phase throughout this portion of the tower would be liquid whereas in the upper portion using trays of the type of FIGURES 1 and 2, the continuous phase above the froth level would be gas. Also, the open area of the FIGURES 3 and 4 trays as used in the practice of this invention would preferably be in the upper part of the range, or even higher, say 25 to 35 percent of the tray area. It will be apparent that the principal purpose of the perforated trays is to baffle the flow of liquid, and to prevent agglomeration of the gas into big bubbles. They provide a series of stages of contact between gas and liquid, preventing massive transfer of liquid from the bottom of the tower to the top of the flooded section.

While the trays illustrated in FIGURES 1 through 4 are of the perforated type, the invention may equally well be practiced with bubble trays, tunnel trays or valve trays in place of FIGURES 1 and 2 and grid trays, ripple trays or any other type of tray designed to operate without downcomers in place of FIGURES 3 and 4. In fact, it is even possible to use FIGURE 1 and 2 type trays throughout the column and still operate satisfactorily, or to use FIGURE 3 and 4 type trays throughout. The separation of the FIGURE 1 and 2 types in the upper portion and the FIGURE 3 and 4 types in the lower flooded portion is merely a preferred embodiment of this invention.

Figure 5:
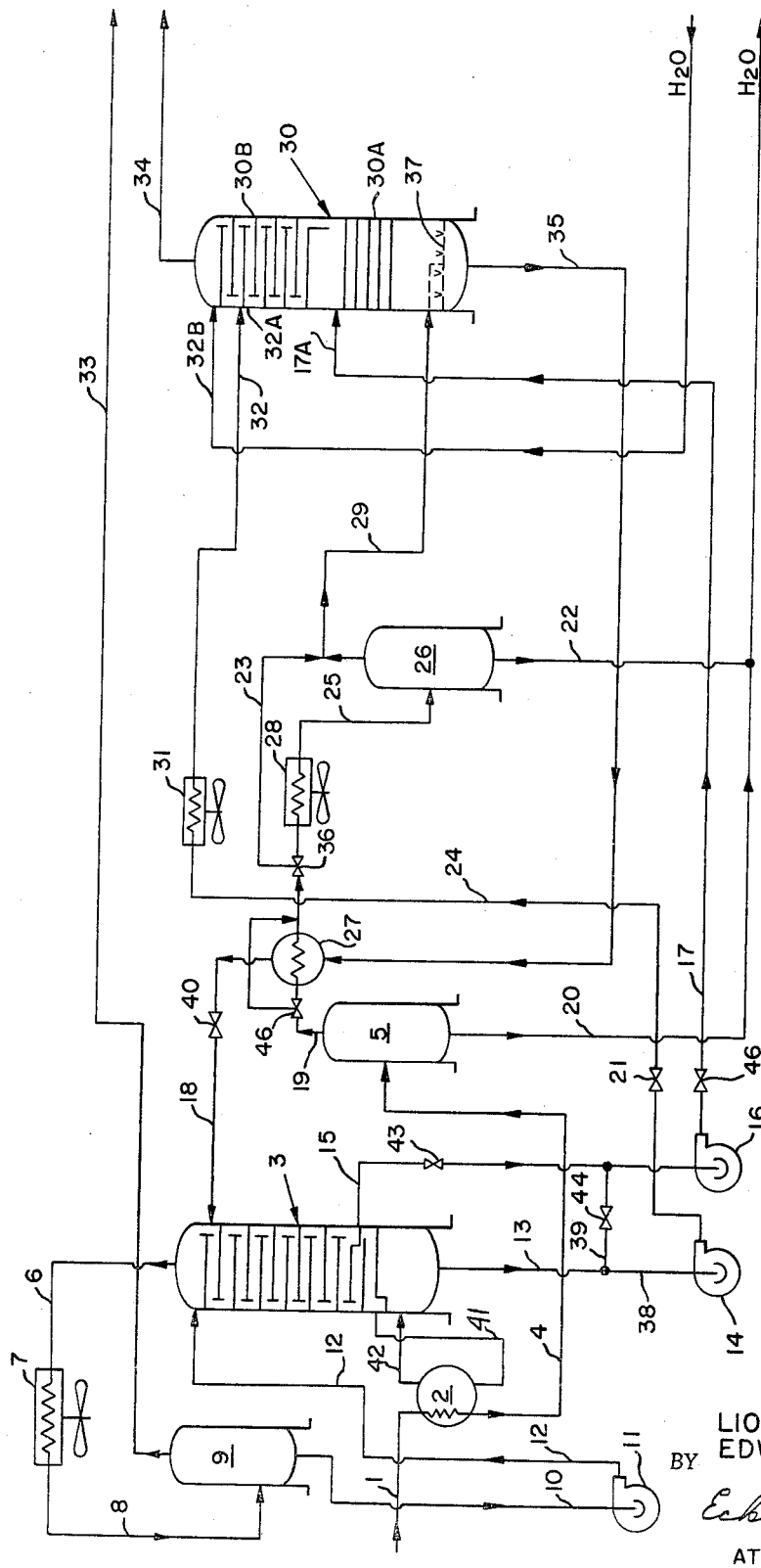
FIGURE 5 is a flow diagram of an apparatus embodying the present invention wherein a single absorption column is employed.
Figure 6:
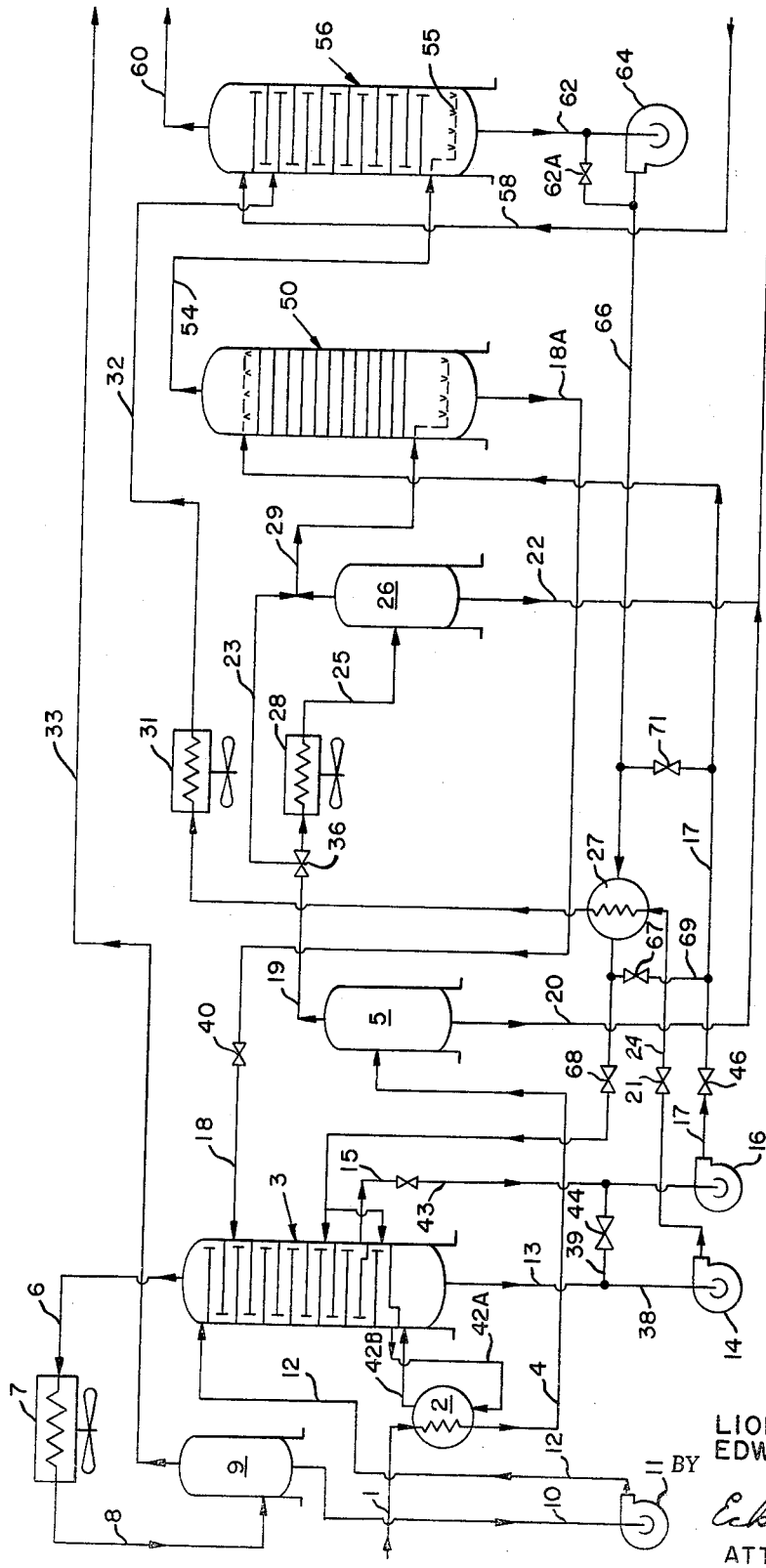
FIGURE 6 is a flow diagram of an apparatus embodying the present invention wherein two absorbing columns are employed.

The principal modification in the process flow as shown in FIGURES 5 and 6 is to provide a high temperature zone in the lower, flooded portion of the column, which is preferably fitted with FIGURE 3 and 4 type trays. The higher temperature is obtained by supplying hot gas or hot absorbent to this zone, or both. Frequently, it is not convenient to supply hot gas. For example, the gas may have to be cooled in the prior processing to condense water or some other high boiling component as a means of recovering such a component, or simply to dehumidify the gas to prevent accumulation of water in the absorbent solution by condensation in the cooler upper portion of the absorption tower. On the other hand, if water thus accumulated can be readily vented in some other part of the cycle, for example, in the regenerator, it might be desirable not to cool the gas, and to deliberately let it dilute the solution and enhance its absorptive efficiency by virtue of the well-known principle that dilute solutions are more effective absorbents than concentrated solutions.

The actual temperature to be used depends to a certain extent on the absorbent material used. Table I gives the preferred ranges for the top and bottom sections for a variety of absorbents.

TABLE I.—ABSORPTION TEMPERATURE, ° F.

| Absorbent solution | Bottom section | Upper section |
|---|---|---|
| Alkanolamines | 190–230 | 100–130 |
| Carbonate | 190–250 | 180–200 |
| Carbonate and arsenite | 190–250 | 120–170 |

The absorbent solutions are generally aqueous, although the use of other solvents such as sulfolane or the water soluble alcohols may be employed if desired. Typical concentrations are as follows:

| | | Concentration |
|---|---|---|
| Alkanolamines | wt. percent | 5–20 |
| Carbonate | wt. percent | 15–25 |
| Carbonate-Arsenite: | | |
|   Carbonate as $K_2O$ | gm./liter | 200 |
|   Arsenite as $AS_2O_3$ | gm./liter | 140 |

The carbonate-arsenite solution is commonly known as Vetrocoke solution, and is described in U.S. Patent 3,037,-844. Other proprietary activated carbonate solutions are known to the art such as "Catacarb" or those containing other activators. These generally require conditions intermediate between unactivated carbonate and Vetrocoke.

The embodiment of the invention shown in FIGURE 5 will be described in a typical example. The apparatus shown in FIGURE 5 applies to treatment of a converted gas in a hydrogen plant or in the synthesis gas generator of ammonia plant. It may be obtained from by-product coke ovens, by steam reforming of natural gas, LPG or naphtha, or by the partial oxidation of coal, coke, or any hydrocarbonaceous material. It would normally be available at a temperature of about 300 to 350° F., and is saturated with water. Carbon dioxide content is typically between 5 and 35 percent, the balance being mainly hydrogen with minor amounts of nitrogen, carbon monoxide, argon and methane. In hydrogen generating plants, nitrogen may be completely absent, depending on the composition of the feed stock or on the purity of the oxygen used in a partial combustion step. In the example selected, the gas is saturated with water, at a temperature of 300 to 350° F., and a pressure of 100 to 400 p.s.i.g. Higher pressures are advantageous although not generally available in the presence state of the commercial art.

The gas is conveyed through conduit 1 to the regenerator reboiler 2 where it transfers its heat through indirect exchange with regenerated solution. In alkanolamine systems, it is important that the gas be at a temperature not substantially higher than 300° F. to prevent degradation of the amine. In such systems, it may be necessary to employ a second reboiler heated by 40 p.s.i.g. steam to provide the required heat for regeneration.

The partially cooled gas leaves the reboiler through conduit 4 at a temperature of 250° F. to 290° F., depending on the heat demand of the system, and the temperature at the reboiler inlet. The gas flows to knock out pot 5 where aqueous condensate is separated and removed through line 20. As described above, the gas may be passed through conduit 19 and valve 46 and may be cooled in the solution preheater 27 and conveyed without further cooling through conduits 23 and 29 to the base of absorber 30, or it may be divided by means of valve 36, part being cooled in cooler 28, and the balance flowing through conduit 23 uncooled. The cooled portion is conveyed through line 25 to separator 26 to separate cooled gas from condensate. The aqueous phase is removed through conduit 22. The setting of the valve 36 regulates the temperature of the gas entering the absorber 30.

The absorber 30 may contain a total of 20 to 50 trays or more wherein 10 to 20 of the trays in the bottom section 30A are of the type shown in FIGURES 3 and 4, and 15 to 30 or more trays in the upper section 30B are of the type shown in FIGURES 1 and 2. The tower is provided with at least two nozzles for entry of solution, the first designated 17A located between the uppermost FIGURE 3 type tray and the lowermost FIGURE 1 type tray. Hot solution at a temperature of 200 to 240° F., preferably 210 to 220° F. is supplied to this tray. This solution may be a fully regenerated solution taken from the bottom of regenerator 3 through conduits 13 and 39 through valve 44 or it may be a partially regenerated solution withdrawn from one of the lower trays of the generator through conduit 15 and valve 43 then pumped by pump 16 to the necessary pressure to deliver it to the absorber through conduit 17 and valve 46. The amount of solution supplied hot will normally be in the range of 55 to 90 percent of the total solution in circulation.

The balance of the solution is taken from the bottom of the regenerator 3 through conduits 13 and 38 to pump 14, and through valve 21, conduit 24, cooler 31, and finally to the absorber through conduit 32 to the second entry nozzle 32A. In this circuit the regenerated solution is cooled to the appropriate temperature given in Table I. It then preferably enters the absorber 30 above the topmost FIGURE 1 type tray. If desired, this cooled solution entry point may be lowered a tray or two as shown in FIGURE 5 and water supplied to the top tray through conduit 32B. This is frequently desirable as a precautionary measure to prevent entrainment of absorbent solution droplets into the purified gas stream. In cases where a high degree of gas purification is desired, it may be necessary to use a deaerated or stripped steam condensate stream containing no more than trace amounts of $CO_2$ or bicarbonate. The water gas trays may be of the FIGURE 1 type, or they may have conventional weir heights of 1 to 2 inches.

The hot or cooled impure gas stream from line 29 enters near the base of tower 30 preferably through a sparger 37 to provide a continuous flow of gas as bubbles. The gas percolates upward through the flooded zone containing FIGURES 3 and 4 type trays where it is contacted with hot solution. At each tray, its velocity is increased through the restriction of the reduced hole area, creating turbulence and simultaneously being broken up into smaller bubbles. After leaving the flooded zone it enters the section provided with FIGURES 1 and 2 type trays. Typically, 70 to 90 percent of the $CO_2$ is removed from the gas at this stage and it is saturated with water at the partial pressure of the absorbent solution.

As the gas enters the cooler portion of the tower, it also cools, and delivers both water and heat to the solution. Thus, whereas the bottom portion of the tower may have a relatively small temperature gradient by virtue of the heat of reaction of $CO_2$ with absorbent, the thermal gradient in the upper portion is generally somewhat greater, and is due principally to heat transfer from the gas to the solution both as sensible heat and latent heat of condensation plus a small effect from reaction of the remaining $CO_2$.

The gas leaves the tower at the top tray through conduit 34 substantially at the temperature of the cooled solution.

Rich solution flows under pressure from the bottom of the absorber through conduit 35 and thence to the solution preheater 27 and to the regenerator 3 through valve 40 and conduit 18. Temperature control of rich solution at the outlet of the preheater is provided by regulation of the three-way by-pass valve 46 on the hot gas side of preheater 27.

The trays in regenerator 3 are preferably all of the FIGURES 1 and 2 type and are provided with downcomers. Use of FIGURES 3 and 4 type trays in the lower portion as in the absorber, combined with flooding would be expected to enhance regeneration by providing maximum contact time. However, at the higher temperatures of the regenerator, the desorption of absorbate is normally sufficiently rapid, and the moderate contact time provided by FIGURE 1 type trays is adequate for satisfactory regeneration. The advantage of the FIGURE 1 type trays is that they require lower pressure drop and therefore permit lower reboiler temperatures. The lower temperatures permit more efficient heat recovery from the gas. This is the principal reason for preferring the FIGURE 1 type trays. To minimize pressure drop, regenerator trays may even be conventional downcomer trays with normal height weirs.

The rich solution preferably is charged to the regenerator two or three trays from the top. The top trays are provided with condensate water through conduit 12; the reflux water is used to wash down possible entrainment of absorbent, or in the case of alkanolamine absorbent, to wash back volatilized alkanolamine.

As the rich solution descends through the regenerator trays, it is progressively stripped of absorbate by steam rising countercurrently to the flow of absorbent solution. The steam is generated by boiling of solution provided by taking a side stream through conduit 41 through heat supplied to the reboiler 2 by hot gas entering the reboiler tubes through conduit 1. The steam and hot solution are conveyed to the bottom of the regenerator through conduit 42, where the steam and fully regenerated solution are separated into a steam phase and a solution phase. The steam rises through the trays, and leaves the regenerator via conduit 6 to condenser 7, thence through conduit 8 to reflux accumulator 9. Aqueous condensate is separated from absorbate gas which exits from the system through conduit 33. The condensate flows through conduit 10 to pump 11 which pumps the water through conduit 12 to the wash trays of the regenerator. Pressure in the reflux accumulator is approximately atmospheric, and the temperature between about 100 and 150° F.

Regenerated solution is returned to the absorber as described previously, thus completing the circuit.

FIGURE 6 illustrates a modification of the process flow using two absorber towers. The arrangement of FIGURE 6 provides considerable flexibility in the flow of solution to and from the second stage absorber. Many of the pieces of equipment are common to both FIGURES 5 and 6 and therefore bear the same members.

As in the process flow illustrated in FIGURE 5, hot, water-saturated gas to be purified enters through conduit 1 and flows under pressure of 100 to 400 p.s.i.g. and a temperature of 300 to 350° F. to the tubes of reboiler 2. After delivering heat to the solution in the reboiler, the gas is conducted in conduit 4 to separator 5 where gas and aqueous condensate are separated. The condensate is drained under liquid level control to condensate line 20. The separated gas flows through conduit 19 and three-way valve 36 to the cooler 28, and thence through conduit 25 to separator 26 where condensate is again separated and discharged to line 22 under liquid level control. Part of the hot gas is by-passed around cooler 28 through conduit 23 and combines with the cooled gas stream coming from separator 26, the two streams mixing in conduit 29. The temperature of the gas after mixing in line 29 is regulated by the setting of the three-way valve 36. The gas then flows to the bottom of first stage absorber 50; here it rises counter-currently to a descending stream of solution.

The absorber 50 is fitted with FIGURES 3 and 4 type trays and is normally operated in the flooded condition. As in the previous illustration, bulk removal of the absorbate component takes place in this flooded portion. Partially purified gas containing about 15 to 30 percent of its original absorbate content leaves the first storage absorber through line 54 which conveys it to the sparger 55 at the bottom of the second stage absorber 56.

Adsorber 56 is fitted with FIGURES 1 and 2 type trays which may be operated with liquid at about weir level or flooded. The gas rises countercurrently to descending solution and the finally purified gas leaves the top of absorber 56 through line 60.

Returning to the first stage absorber 50, rich solution laden with absorbate leaves the bottom of the tower under pressure through line 18A to valve 40 where it is depressured to substantially atmospheric pressure, and then enters the regenerator 3 through line 18. It is delivered to the third tray counting from the top of the regenerator where a portion of the absorbate flashes immediately. The solution descends through the trays where it is stripped by steam coming from the lower trays. The absorbate is washed with a counter-current stream of reflux water, leaving the top of the regenerator through lines 6 and 8, reflux accumulator 9 and the system through line 33. Condensed water leaves accumulator 9 through line 10 and is pumped by pump 11 through line 12 to the topmost tray of regenerator 3.

Rich solution flows downward through the column where it is progressively stripped of absorbate. At about the third tray counting from the bottom, a major part, from 50 to 75 percent of the total solution stream, is withdrawn through a side draw and line 15. It flows to the suction side of pump 16 and is pumped through valve 46 and line 17 to the top of tray of first stage absorber 50 without any intermediate cooling.

The balance of the solution continues down the regenerator column 3 to tray 1 counting from the bottom and thence to thermosyphon reboiler 2 through line 42A. Steam and hot solution leave reboiler 2 through line 42B which conveys the mixed phase stream to the bottom section of regenerator 3. Here the steam is disengaged from the solution and rises up through the trays in counter-current flow to solution, stripping absorbate as it rises. The solution leaves the bottom of the regenerator through lines 13 and 38 and is delivered to the suction of pump 14. The completely stripped solution discharges through valve 21 into line 24 which conveys it to exchanger 27 and thence to cooler 31. Here the solution is cooled to the appropriate temperature as given in Table I. It is then conveyed to the second stage absorber 56 through line 32.

It will be noted that this solution is extremely well stripped and is therefore capable of effecting a very high degree of purification of gas by virtue of the very low residual partial pressure of the absorbate species.

The lean solution is delivered to the second stage absorber 56 at about the third tray counting from the top. The two top trays are provided with well stripped condensate from line 58. These trays serve to reduce entrainment of lean solution droplets which might otherwise carry over into the purified gas stream.

The lean solution then flows by gravity across the trays in second stage absorber 56 in counter-current flow to rising gas. It leaves the tower through line 62 as a partially enriched solution.

Ordinarily, this partially enriched solution is still capable of use as an absorbent in the first stage absorber 50. It it is desired to use it to increase the volume of solution in the first stage, it is delivered through line 62 to the suction of pump 64 which discharges through line 66 to the shell side of solution exchanger 27 where it is heated in indirect contact with hot lean solution from the bottom of the regenerator 3. It is then conveyed through valve 67 (valve 68 being closed) to lines 69 and 17 and thence to the first stage absorber.

Alternatively it may bypass solution exchanger 27 through valve 71. The bypass may be either total or partial. Bypassing exchanger 27 will progressively lower the absorbent temperature in first stage absorber 50.

A third alternative flow is possible in case it is not desired to utilize the partially enriched solution from second stage absorber in the first stage. In this case, pump 64 would be shut off, and partially enriched solution would flow through line 62, valve 62A, line 66, exchanger 27 and valve 68 (valves 67 and 71 being closed) to the regenerator 3. The point of entry is at about the second tray above the side draw tray, since in this case the solution would be somewhat too rich to use in the first stage absorber.

The type of process flow symbolized in FIGURE 6 is particularly useful in case two sources of rich gas are to be treated, one of which may be rich in $CO_2$, the other relatively lean. In such a case, the rich gas would be fed hot to the first stage absorber 50, the cooled lean gas to the second stage absorber 56 in combination with the partly treated gas flowing through conduit 54 through a nozzle (not shown in FIG. 4) near the point of entry to column 56.

The following comparisons between the present invention and the prior art illustrate the advantages of the invention. Examples 1, 2, 3 and 4 were all carried out on the same commercial tower shell. The first two are typical of operations with a conventionally designed tower without flooding of the lower portion. If the lower portion had been flooded, the $CO_2$ contents of the purified gas would be about half of those shown.

The second two illustrate the invention with the split flow of solution, increased weir height, and a large thermal gradient in the column.

COMPARISON OF ABSORBER PERFORMANCE

| Type of Tower | Conventional | | Present Invention | |
|---|---|---|---|---|
| Example No. | 1 | 2 | 3 | 4 |
| Tower diam., ft. | 10.5 | 10.5 | 10.5 | 10.5 |
| Number of trays | 25 | 25 | 25 | 25 |
| Weir heights, inches | 2 | 2 | 4 | 4 |
| Raw Gas: | | | | |
| Rate, mm.c.f.d. | 60.0 | 51.5 | 50.5 | 77.8 |
| Percent $CO_2$, v. percent | 19.3 | 18.9 | 19.0 | 19.1 |
| Solution, arsenic-activated hot carbonate, rate, g.p.m. | 2,890 | 2,899 | 3,100 | 3,100 |
| Temperatures, °F.: | | | | |
| Absorber top | 150 | 157 | 141 | 147 |
| Absorber bottom | 165 | 166 | 180 | 180 |
| Lean solution, percent $HCO_3^-$ | 2 | 1 | 4 | 8.5 |
| Purified gas, percent $CO_2$ | 1.4 | 1.3 | 0.40 | 0.54 |

The practice of the invention as exemplified in this specification provides the following advantages, and useful results in comparison with the conventional process scheme include the following.

(1) Independent temperature control of the top and bottom of the absorber tower, providing optimum conditions for each section.

(2) Reduced solution cooling requirements and concomitant reduction in cooling surface and capital cost.

(3) Reduced heat demand for the process as a whole.

(4) Improved $CO_2$ removal by provision of longer contact time, higher froth levels and increased bubbling area in the upper cooler section of the absorber by reducing the tower cross section occupied by downcomers.

(5) Providing maximum contact time and reaction velocity in the hot, lower section of the absorber where the great bulk of the $CO_2$ is absorbed.

We claim:

1. In the process for the extraction of carbon dioxide from a gas stream utilizing as an absorbent an aqueous thermally regeneratable alkaline solution, the improvement comprising, introducing a gas stream containing carbon dioxide to be extracted substantially at the bottom of a first extraction zone, introducing a stream of a thermally regeneratable alkaline solution containing alkali at a concentration such that its bicarbonate will not precipitate as a solid phase in spent solution near the top of said first zone whereby said first zone is flooded with alkaline solution to increase residence time of the solution in the zone, said gas and said solution flowing countercurrently to each other in said zone causing the bulk of said carbon dioxide to be extracted in said first zone, introducing effluent gas from the first zone near the bottom of a second extraction zone containing gas liquid contact elements and having a liquid level maintained at a point below the lowest of said gas liquid contact elements, introducing a second stream of said regeneratable alkaline solution near the top of said second extraction zone whereby the fluids flow in countercurrent flow in said zone and substantially the remainder of the carbon dioxide is extracted in said second zone, and separately controlling the temperature in each of said extraction zones so as to maintain said first zone at a higher temperature than said second zone, said first zone having an absorption temperature of from 190°–250° F. and said second zone having an absorption temperature of from 100° to 200° F.

2. The process as set forth in claim 1 wherein the stream of alkaline solution introduced near the top of said first zone is partially regenerated and said alkaline solution introduced into said second extraction zone is more fully regenerated.

3. The process of claim 1 wherein the first zone is provided with sieve trays without downcomers and wherein the second zone is provided with trays having downcomers therein.

4. The process of claim 1 wherein the first and second zones are located in the bottom and top, respectively, of the same column.

5. The process of claim 1 wherein the first and second zones are in separate columns.

References Cited

UNITED STATES PATENTS

| 960,788 | 6/1910 | Behrens | 23—150 |
| 2,205,962 | 6/1940 | Reich | 23—150 |
| 2,624,694 | 1/1953 | Sailors | 23—3 X |
| 1,212,456 | 1/1917 | Claude | 23—4 |
| 2,615,787 | 10/1952 | Randlett | 23—2 |
| 2,912,301 | 11/1959 | Schreiner et al. | 23—3 |
| 2,943,910 | 7/1960 | Giammarco | 23—2 |
| 3,101,996 | 8/1963 | Bresler et al. | 23—2 |
| 3,245,752 | 4/1966 | Fryer et al. | 23—2 |

OSCAR R. VERTIZ, Primary Examiner

E. C. THOMAS, Assistant Examiner